United States Patent Office 2,939,165
Patented June 7, 1960

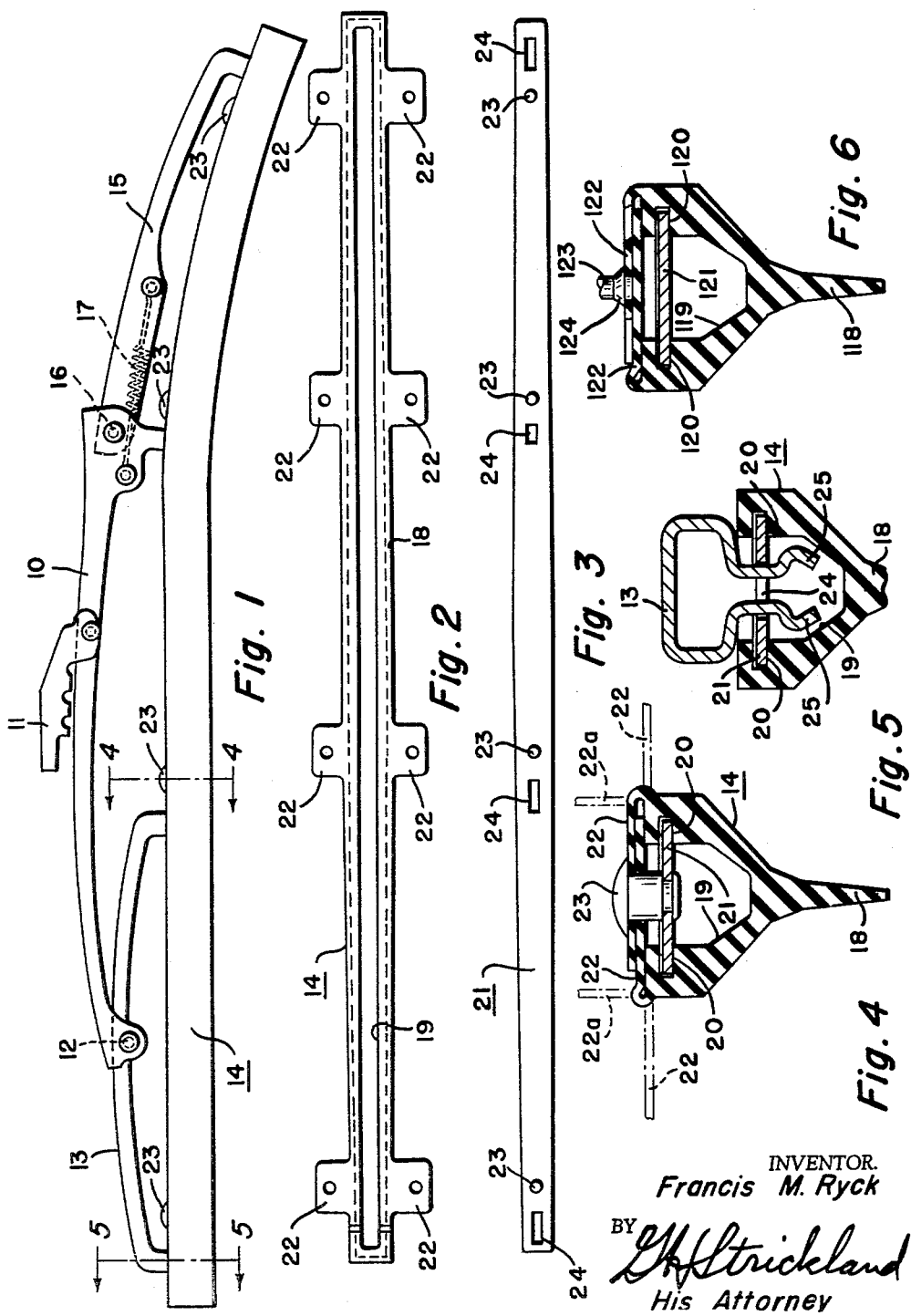
June 7, 1960　　F. M. RYCK　　2,939,165
WIPER BLADE
Filed Dec. 26, 1957
INVENTOR.
Francis M. Ryck
BY
Strickland
His Attorney

2,939,165

WIPER BLADE

Francis M. Ryck, Rochester, N.Y., assignor to General Motors Corporation, Detroit, Mich., a corporation of Delaware Filed Dec. 26, 1957, Ser. No. 705,189

7 Claims. (Cl. 15—250.36)

This invention pertains to wiper blades such as are used to wipe windshields and other types of windows.

Windshield wiper blades of elastomeric material have been made incorporating a flexible backing in the thick part of the blade.

It is an object of this invention to provide an improved construction by which the flexible spring metal backing is securely locked in place in such a way that the blade can be readily removed from the backing and a new blade easily fastened thereon.

This and other objects are attained in the forms shown in the drawing in which a wedge shaped member of elastomeric material is provided with a channel in the thick part of the wedge in which is received the flexible spring metal backing. The blade on the opposite sides of the channel is provided at convenient places with pairs of flaps which extend toward each other and overlap the backing to hold it firmly in place. The pairs of flaps may either be fastened together by a button and buttonhole arrangement provided on the flaps or adjacent each pair of flaps, the backing may be provided with a rivet which serves as a button for buttoning both flaps thereon.

Further objects and advantages of the present invention will be apparent from the following description, reference being had to the accompanying drawings wherein a preferred embodiment of the present invention is clearly shown.

In the drawings:

Figure 1 is a view in elevation of a wiper blade and linkage construction for a curved windshield embodying one form of my invention;

Figure 2 is a plan view of the blade without the backing;

Figure 3 is a plan view of the backing;

Figure 4 is a sectional view taken along the lines 4—4 of Figure 1;

Figure 5 is a sectional view taken along the lines 5—5 of Figure 1; and

Figure 6 is a sectional view of a modified form of the invention.

Referring now more particularly to Figure 1, the wiper blade includes a pressure distributing linkage for super structure which includes a primary holder or yoke 10 having suitable arm attaching means 11. The inner end of the holder 10 is connected by pivot means 12 to the intermediate portion of the secondary yoke 13. The opposite ends of the secondary yoke are connected by means to be described hereafter to a blade construction called a squeegee unit 14. Extending from the member 10 and connected to it by a pivot 16 is a cantilever arm 15. The holder 10 and the cantilever arm 15 are also connected by a tension spring 17 for applying pressure to the end of the blade. The outer end of the cantilever arm 15 as well as the portion of the holder 10 adjacent the pivot 16 are provided with connections to the squeegee unit 14. This super structure operates to distribute arm applied pressure to the wiper or squeegee unit and in addition the tension spring normally pivots the cantilever arm 15 relative to the holder so as to cause the squeegee unit to conform to the curvilinear surface of the windshield as illustrated in Figure 1.

The blade or squeegee unit 15 includes a wedge-shaped wiping element 18, shown separately in Figure 2, preferably formed of rubber, either natural or synthetic. It is provided with a channel 19 in its widest portion extending longitudinally of the squeegee unit 18 substantially from one end to the other. This channel is provided with notches 20 on each side for receiving the thin flexible spring metal backing 21 separately shown in Figure 3.

According to this invention, to provide an improved method of holding the flexible backing strip and the squeegee unit or blade together, the squeegee unit or blade 18 is provided with integrally molded and connected laterally extending flaps 22 which may be molded to extend either outwardly or upwardly as illustrated in dot-dash lines in Figure 4. Opposite each set of flaps 22, the flexible backing 21 is provided with a rivet 23 having a large rounded head. This rivet 23 has its head projecting above the flaps 22. Each of the flaps is provided with a button hole which buttons over the head of the rivet 23 as it is clearly shown in Figure 4. This prevents the sides of the thick portion of the blade or squeegee unit 18 from spreading and firmly holds the flexible backing 21 in the notches 20 provided for it within the channel 19 as shown in Figure 4. This provides an excellent locking connection between the flexible backing 21 and the blade or squeegee unit 18 so that the blade or squeegee unit 18 is able to conform to the curvilinear surface of the glass as it is operated by the wiper 11.

The flexible backing strip 21 is provided with four slots 24 which receive the spring tongues 25 provided at the ends of the secondary yoke 13, the holder 10 and the cantilever arm 15. These spring tongues 25 have their lowermost portions bowed outwardly so that after they are pushed through the slots 24 they will provide a relatively firm removable resilient connection between the yoke 13, the holder 10 and the cantilever arm 15 with the flexible backing strip 21. The flexible backing strip 21 then serves to provide the connection with the rubber blade or squeegee unit 18.

In Figure 6, a modified form of the invention is shown in which the wiper blade or squeegee unit 118 has a similar channel 119 provided with similar notches 120 receiving a similar flat backing strip 121. However, the backing strip 121 is not provided with any rivets corresponding to the rivets 23. It, however, does have notches or slots corresponding to the notches or slots 24 in the strip 21. The blade or squeegee unit 118 is provided with integrally molded flaps 122. These flaps when molded extend directly upwardly opposite to the narrow portion of the blade. After the flexible backing strip 121 is inserted within the notches 120 in the channel 119, the flaps 122 are folded toward each other in overlapping fashion and buttoned by an integral button 123 provided on the lowermost flap and extending through the button hole in the upper flap. This integral button 123 may have a pointed tip so that it may be readily threaded through the buttonhole and a conical shaped button flange 124 so that it may readily pass through the buttonhole in the upper flap.

As many of these flaps as are needed may be provided along the blades or squeegee units 18 or 118. These flaps may be made as long as desired and may be provided with more than one button and button hole. This provides a very simple and yet very secure method of securely locking the flexible backing to the blade or squeegee unit.

While the embodiments of the present as herein disclosed constitute a preferred form, it is to be understood that other forms might be adopted.

What is claimed is as follows:
1. A wiper blade including an elongated wedge shaped member of elastomeric material, the thick portion of said member being provided with a longitudinal channel having closed ends containing a longitudinally extending flexible backing, the thick portion of said member being also provided with spaced integral flaps joining the remainder of said member on opposite sides of said channel and extending toward each other and overlapping over said channel and said backing, and fastening means fastening together the overlapped portion of said flaps, said backing being exposed between said flaps to permit attachment of a pressure distributing linkage therewith.

2. A wiper blade including an elongated wedge shaped member of elastomeric material, the thick portion of said member being provided with a longitudinal channel containing a longitudinally extending flexible backing, the thick portion of said member being also provided with integral flaps joining the remainder of said member on opposite sides of said channel and extending toward each other and overlapping over said channel and said backing and button type fastening means fastening together the overlapped portion of said flaps.

3. A wiper blade including an elongated wedge shaped member of elastomeric material, the thick portion of said member being provided with a longitudinal channel containing a longitudinally extending flexible backing, the thick portion of said member being also provided with integral flaps joining the remainder of said member on opposite sides of said channel and extending toward each other and overlapping over said channel and said backing, one of said flaps in its overlapping portion being provided with a button, the opposite flap being provided with a buttonhole receiving said button for buttoning the flaps together.

4. A wiper blade including an elongated wedge shaped member of elastomeric material, the thick portion of said member being provided with a longitudinal channel containing a longitudinally extending flexible backing, the thick portion of said member being also provided with integral flaps joining the remainder of said member on opposite sides of said channel and extending toward each other and overlapping over said channel and said backing, said backing being provided with a button, the overlapping portions of said flaps each being provided with button holes buttoning upon said button for fastening the flaps together and holding the backing.

5. A wiper blade including an elongated wedge shaped member of elastomeric material, the thick portion of said member being provided with a longitudinal channel containing a longitudinally extending flexible backing, the thick portion of said member being also provided with integral flaps joining the remainder of said member on opposite sides of said channel and extending toward each other and overlapping over said channel and said backing, one of said flaps in its overlapping portion being provided with an integrally molded button, the other of said flaps being provided with a button hole buttoning over said button to button the flaps together over said channel and backing.

6. A wiper blade including an elongated wedge shaped member of elastomeric material, the thick portion of said member being provided with a longitudinally extending channel having closed ends containing a flexible backing, integral flaps diametrically located on opposite sides of said channel integrally connected to said member and extending toward each other and overlapping over said channel and said backing, said overlapped sets of flaps being distributed and spaced apart longitudinally along said member, and means fastening together the overlapped portions of said flaps, said backing being exposed between said spaced flaps to permit attachment of a pressure distributing linkage therewith.

7. A squeegee unit including, an elongate wiping element having a wiping edge along one margin and an open backing chamber with closed ends along the opposite margin, flexible backing means disposed within said backing chamber, said wiping element having longitudinally spaced sets of integral flaps extending in opposite directions along said opposite margin and adapted to be overlapped over said open backing chamber, and means fastening said flaps together in overlapped relation to retain said backing means in assembled relation with said wiping element said backing means being exposed between the pairs of flaps to permit attachment of a pressure distributing linkage therewith.

References Cited in the file of this patent
UNITED STATES PATENTS

| | | |
|---|---|---|
| 2,728,100 | Oishei | Dec. 27, 1955 |
| 2,792,585 | Scinta | May 21, 1957 |